United States Patent
Watanabe

(10) Patent No.: US 10,310,449 B2
(45) Date of Patent: Jun. 4, 2019

(54) LOUVER ASSEMBLY FOR AN IMAGE FORMING APPARATUS

(71) Applicant: CANON KABUSHIKI KAISHA, Tokyo (JP)

(72) Inventor: Koichi Watanabe, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/595,078

(22) Filed: May 15, 2017

(65) Prior Publication Data

US 2017/0336758 A1 Nov. 23, 2017

(30) Foreign Application Priority Data

May 23, 2016 (JP) .................................. 2016-102258

(51) Int. Cl.
| | |
|---|---|
| *G03G 21/20* | (2006.01) |
| *B41J 2/415* | (2006.01) |
| *B41J 11/00* | (2006.01) |
| *G03B 27/26* | (2006.01) |
| *B41J 2/17* | (2006.01) |

(Continued)

(52) U.S. Cl.
CPC .......... *G03G 21/206* (2013.01); *B41J 2/1714* (2013.01); *B41J 2/1721* (2013.01); *B41J 2/185* (2013.01); *B41J 2/4155* (2013.01); *B41J 11/00* (2013.01); *B41J 29/13* (2013.01);

(Continued)

(58) Field of Classification Search
CPC ......... G03G 21/206; G03G 2221/1645; G03B 27/26; B41J 1/00; B41J 2/4155
See application file for complete search history.

(56) References Cited

U.S. PATENT DOCUMENTS

| | | | | |
|---|---|---|---|---|
| 9,310,763 B2* | 4/2016 | Hata | ..................... | G03G 21/206 |
| 2006/0110172 A1* | 5/2006 | Iijima | ................ | G03G 15/2003 |
| | | | | 399/44 |

(Continued)

FOREIGN PATENT DOCUMENTS

| | | | | |
|---|---|---|---|---|
| EP | 0419881 A1 * | 4/1991 | ......... | G03G 21/1814 |
| EP | 2 680 089 A1 | 1/2014 | | |

(Continued)

OTHER PUBLICATIONS

European Search Report issued in corresponding European Application No. 17168937.5 dated Oct. 9, 2017.

*Primary Examiner* — David J Bolduc

(74) *Attorney, Agent, or Firm* — Venables LLP

(57) ABSTRACT

An image forming apparatus includes a housing of an apparatus body, an electrical equipment portion provided to project in a horizontal direction with respect to the housing, wherein a space is provided under the electrical equipment portion, a cover configured to cover the electrical equipment portion, and a louver which comprises plural slats arranged with intervals therebetween and through which an inside of the cover communicates with an outside of the cover, and is provided in a lower surface portion of the cover. The louver comprises a first louver member and a second louver member. The first louver member comprises a first slat portion constituting a part of the slats. The second louver member comprises a second slat portion disposed below the first slat portion to overlap with the first slat portion at least partially in a front view of the louver and constituting another part of the slats.

19 Claims, 6 Drawing Sheets

(51) Int. Cl.
*B41J 2/185* (2006.01)
*B41J 29/13* (2006.01)
*B41J 29/377* (2006.01)

(52) U.S. Cl.
CPC ............ B41J 29/377 (2013.01); G03B 27/26 (2013.01); *G03G 2221/1645* (2013.01)

(56) References Cited

U.S. PATENT DOCUMENTS

| | | | | |
|---|---|---|---|---|
| 2007/0104509 | A1* | 5/2007 | Kabashima | G03G 15/6502 399/124 |
| 2008/0050144 | A1* | 2/2008 | Hashimoto | G03G 15/2017 399/92 |
| 2008/0050145 | A1 | 2/2008 | Hanano | |
| 2008/0145092 | A1* | 6/2008 | Tomatsu | G03G 21/206 399/93 |
| 2010/0034553 | A1* | 2/2010 | Kawamata | G03G 21/206 399/92 |
| 2011/0064449 | A1* | 3/2011 | Shimizu | G03G 15/2017 399/92 |
| 2011/0110678 | A1* | 5/2011 | Nishikawa | G03G 21/203 399/92 |
| 2012/0051778 | A1* | 3/2012 | Nishino | G03G 21/203 399/92 |
| 2012/0141173 | A1* | 6/2012 | Iwasaki | G03G 15/2075 399/327 |
| 2013/0195500 | A1* | 8/2013 | Saeki | G03G 15/2017 399/97 |
| 2013/0236207 | A1* | 9/2013 | Hirakawa | G03G 21/206 399/92 |
| 2013/0243453 | A1* | 9/2013 | Horie | G03G 21/206 399/44 |
| 2014/0003833 | A1* | 1/2014 | Asakawa | G03G 21/206 399/92 |
| 2014/0093269 | A1* | 4/2014 | Hirasawa | F24F 13/00 399/92 |
| 2014/0147160 | A1* | 5/2014 | Konishi | G03G 21/206 399/92 |
| 2014/0255057 | A1 | 9/2014 | Yoshino | |
| 2014/0321868 | A1* | 10/2014 | Tsutsumi | G03G 21/206 399/44 |
| 2016/0209806 | A1* | 7/2016 | Shiomi | G03G 21/206 |
| 2017/0160699 | A1* | 6/2017 | Imanari | G03G 21/206 |

FOREIGN PATENT DOCUMENTS

| | | | |
|---|---|---|---|
| JP | 57078577 A | * 5/1982 | ........... G03G 21/206 |
| JP | 09-281876 A | 10/1997 | |
| JP | 2003-076253 A | 3/2003 | |

* cited by examiner

LOUVER ASSEMBLY FOR AN IMAGE FORMING APPARATUS

BACKGROUND OF THE INVENTION

Field of the Invention

The present invention relates to an image forming apparatus including a louver for ventilation between the inside and outside of an apparatus body.

Description of the Related Art

Conventionally, an image forming apparatus such as a printer or a copier employing an electrophotographic system includes a heat generating portion such as various kinds of heat source or electric boards in the apparatus body thereof. Therefore, Japanese Patent Laid-Open No. 2003-76253 discloses an image forming apparatus including ventilation fans inside an apparatus body so as to generate an airflow by the ventilation fans to cool devices disposed in the apparatus body. In this image forming apparatus, an air inlet is formed in a right side surface of the apparatus body, and an air outlet is formed in a left side surface of the apparatus body. The ventilation fans are disposed inside the air outlet so as to oppose each other. By driving the ventilation fans, an airflow streaming from the air inlet to the air outlet in the apparatus body is generated, and this airflow cools a heat generating portion in the apparatus body. Louvers are provided in the air inlet and the air outlet such that the inside of the apparatus body cannot be seen from the outside while letting air flow therethrough.

However, in the image forming apparatus disclosed in Japanese Patent Laid-Open No. 2003-76253 in which the louvers are provided in side surfaces of the apparatus body, a louver is obstructed by a wall surface in the case where the image forming apparatus is installed such that a side surface of a cover is in contact with the wall surface. Therefore, there is a problem that the apparatus body needs to be disposed in a certain distance from the wall surface so as not to obstruct the louver and thus the area required for installation of the image forming apparatus is much larger than the area occupied by the apparatus body. In addition, there is a problem that, since the louvers are provided in the side surfaces of the apparatus body, the inside of the apparatus body may be seen from above or from the side depending on the angle from which the apparatus body is seen. This is not pleasant in terms of the outer appearance of the image forming apparatus. Therefore it was required that the area for installation of the apparatus body can be reduced and the outer appearance of the apparatus body can be improved while providing the louver to the apparatus body.

SUMMARY OF THE INVENTION

According to one aspect of the present invention, an image forming apparatus including a housing of an apparatus body, an electrical equipment portion provided to project in a horizontal direction with respect to the housing, wherein a space is provided under the electrical equipment portion, a cover configured to cover the electrical equipment portion, and a louver which comprises plural slats arranged with intervals therebetween and through which an inside of the cover communicates with an outside of the cover, and is provided in a lower surface portion of the cover. The louver comprises a first louver member and a second louver member. The first louver member comprises a first slat portion constituting a part of the slats. The second louver member is a member different from the first louver member, and comprises a second slat portion disposed below the first slat portion to overlap with the first slat portion at least partially in a front view of the louver and constituting another part of the slats.

Further features of the present invention will become apparent from the following description of exemplary embodiments with reference to the attached drawings.

DESCRIPTION OF THE EMBODIMENTS

An exemplary embodiment of the present invention will be described in detail below with reference to FIGS. 1 to 6. In the present exemplary embodiment, a full-color printer of a tandem type is described as an exemplary image forming apparatus. The image forming apparatus is not limited to a tandem type, and may employ another system. In addition, the image forming apparatus is not limited to a full-color image forming apparatus, and may be a monochromatic image forming apparatus.

Figure 1:
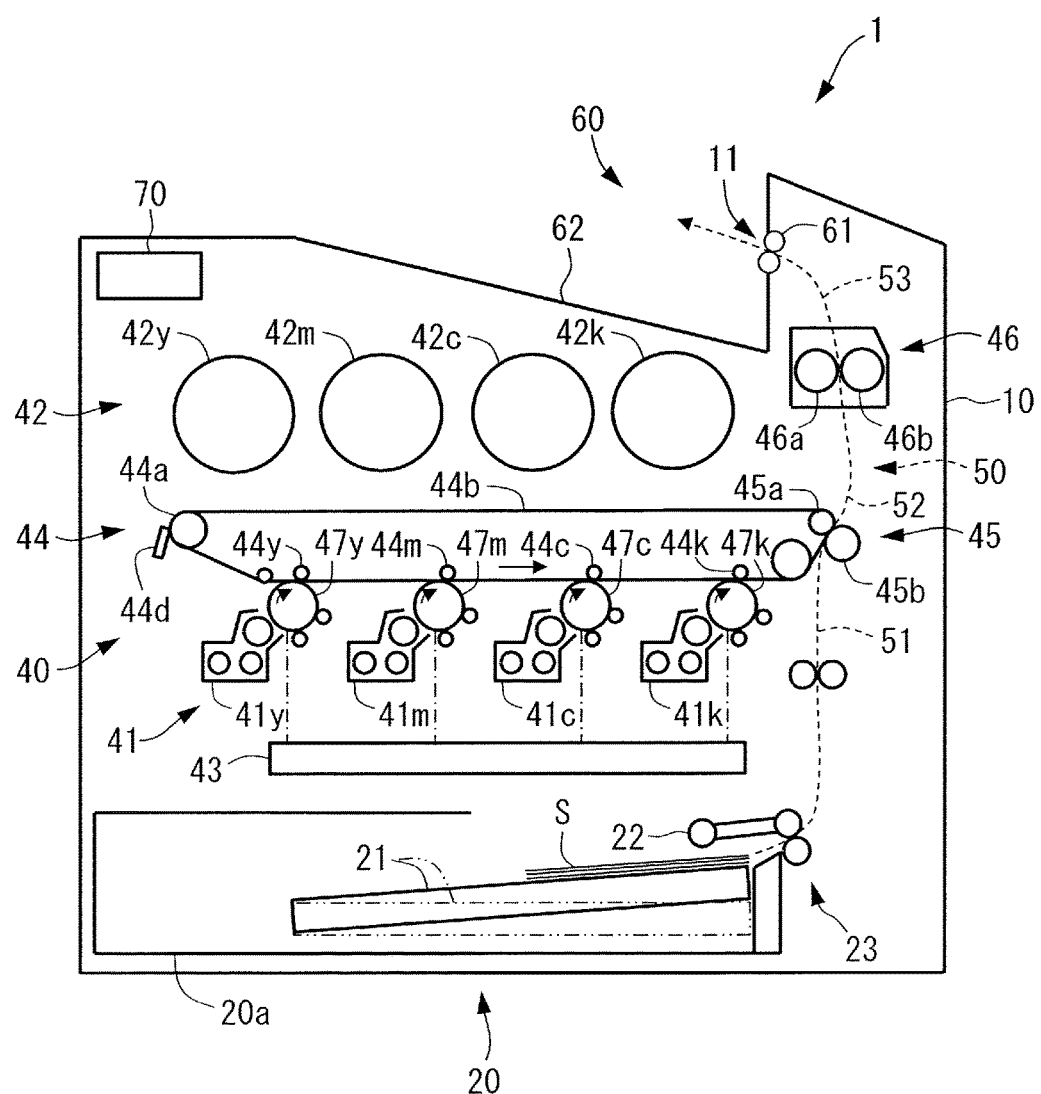
FIG. 1 is a section view of an image forming apparatus according to an exemplary embodiment of the present invention schematically illustrating a configuration thereof.

First, a configuration of an image forming apparatus 1 illustrated in FIG. 1 will be described. The image forming apparatus 1 includes an image forming apparatus body 10. The image forming apparatus body 10 will be hereinafter referred to as an apparatus body 10. The apparatus body 10 includes a sheet feed portion 20, an image forming portion 40, a sheet conveyance portion 50, a sheet discharge portion 60, and a control portion 70. A sheet S serving as a recording material bears a toner image formed thereon. Specific examples of the sheet S include a regular paper sheet, a resin sheet that is a substitute for the regular paper sheet, a postcard, a cardboard, and a sheet for an overhead projector.

The sheet feed portion 20 includes a sheet cassette 20a, a feed tray 21, a feed roller 22, and a separation portion 23. The sheet cassette 20a accommodates sheets S such as recording paper sheets, and the sheet feed portion 20 feeds a sheet S to the image forming portion 40. The feed tray 21 is capable of ascending and descending while supporting the sheet S. In a state where the feed tray 21 has descended, a user can place the sheets S on the feed tray 21. In a state where the feed tray 21 has ascended, the uppermost sheet of the sheets S comes into contact with the feed roller 22.

The image forming portion 40 includes image forming units 41, toner bottles 42, a laser scanner 43, an intermediate transfer unit 44, a secondary transfer portion 45, and a fixing unit 46, and performs image formation.

The image forming units 41 include four image forming units 41y, 41m, 41c, and 41k. The letters y, m, c, and k respectively correspond to yellow, magenta, cyan, and black, and the four image forming units 41y, 41m, 41c, and 41k respectively form toner images of these four colors of yellow, magenta, cyan, and black. The image forming units 41y, 41m, 41c, and 41k are each configured as a process cartridge that can be attached to and detached from the apparatus body 10 by a user. For example, the image forming unit 41y includes a photosensitive drum 47y serving as an image bearing member on which a toner image is formed, and an electrification roller, a developing roller, a drum cleaning blade, toner, and so forth that are not illustrated. In addition, toner is supplied to the image forming unit 41y from a toner bottle 42y filled with toner. The other image forming units 41m, 41c, and 41k each have a similar configuration, and thus the detailed description thereof will be omitted. The laser scanner 43 exposes surfaces of photosensitive drums 47y, 47m, 47c, and 47k to form electrostatic latent images on the photosensitive drums 47y, 47m, 47c, and 47k.

The intermediate transfer unit 44 is disposed above the image forming units 41y, 41m, 41c, and 41k. The intermediate transfer unit 44 includes plural rollers including a driving roller 44a and primary transfer rollers 44y, 44m, 44c, and 44k, intermediate transfer belt 44b looped over these rollers, a cleaning blade 44d, and so forth. The primary transfer rollers 44y, 44m, 44c, and 44k are respectively disposed so as to oppose the photosensitive drums 47y, 47m, 47c, and 47k, and are in contact with the intermediate transfer belt 44b. By applying a transfer bias of a positive polarity to the intermediate transfer belt 44b via the primary transfer rollers 44y, 44m, 44c, and 44k, toner images on the photosensitive drums 47y, 47m, 47c, and 47k each having a negative polarity are transferred onto the intermediate transfer belt 44b so as to be superposed on one another. As a result of this, a full-color image is formed on the intermediate transfer belt 44b. The cleaning blade 44d is in contact with apart of the intermediate transfer belt 44b and removes residual toner attached to the intermediate transfer belt 44b.

The secondary transfer portion 45 includes a secondary transfer inner roller 45a and a secondary transfer outer roller 45b. The full-color image formed on the intermediate transfer belt 44b is transferred onto a sheet S by applying a secondary transfer bias of a positive polarity to the secondary transfer outer roller 45b. The secondary transfer inner roller 45a stretches the intermediate transfer belt 44b on the inner peripheral surface of the intermediate transfer belt 44b. The secondary transfer outer roller 45b is disposed at a position opposing the secondary transfer inner roller 45a with the intermediate transfer belt 44b interposed therebetween.

The fixing unit 46 includes a fixing roller 46a and a pressurizing roller 46b. The sheet S is conveyed and nipped between the fixing roller 46a and the pressurizing roller 46b, and thus the toner image transferred onto the sheet S is fixed onto the sheet S by being heated and pressurized.

The sheet conveyance portion 50 includes a pre-secondary-transfer conveyance path 51, a pre-fixing conveyance path 52, and a discharge path 53, and a sheet S fed by the sheet feed portion 20 is conveyed therethrough from the image forming portion 40 to the sheet discharge portion 60.

The sheet discharge portion 60 includes a discharge roller pair 61 and a discharge tray 62. The discharge roller pair 61 is disposed downstream in the discharge path 53, and the discharge tray 62 is disposed downstream of the discharge roller pair 61. The discharge roller pair 61 feeds, through a nip portion thereof, the sheet S conveyed through the discharge path 53, and discharges the sheet S onto the discharge tray 62 through a discharge port 11 defined in the apparatus body 10.

The control portion 70 is constituted by a computer, and includes, for example, a central processing unit: CPU, a read only memory: ROM, a random access memory: RAM, and an input/output circuit that are not illustrated. The ROM stores a program for controlling each component of the image forming apparatus 1. The RAM is used as a temporary storage for data. The input/output circuits inputs signals from and outputs signals to an external device.

In the image forming apparatus 1 configured in this way, when an image forming operation is started, the photosensitive drums 47y, 47m, 47c, and 47k first start rotating and the surfaces thereof are electrified by the electrification rollers. Then, the laser scanner 43 irradiates the photosensitive drums 47y, 47m, 47c, and 47k with laser light based on image information, and thus electrostatic latent images are formed on the surfaces of the photosensitive drums 47y, 47m, 47c, and 47k. The electrostatic latent images are developed and visualized as toner images as a result of toner attaching to the electrostatic latent images, and these toner images are transferred onto the intermediate transfer belt 44b.

Meanwhile, in parallel with such an operation of formation of a toner image, the feed roller 22 rotates to separate and feed the uppermost sheet S in the feed tray 21. Then, the sheet S is conveyed to the secondary transfer portion 45 through the pre-secondary-transfer conveyance path 51 at a timing matching a timing of conveyance of the toner image on the intermediate transfer belt 44b to the secondary transfer portion 45. According to this, the toner image on the intermediate transfer belt 44b is transferred onto the sheet S. Then, the sheet S is conveyed to the fixing unit 46, and the toner image that is not fixed is subjected to heat and pressure in the fixing unit 46 and is thus fixed onto the sheet S. After this, the sheet S is discharged through the discharge port 11 by the discharge roller pair 61 and supported on the discharge tray 62.

Next, configurations of a cover 13 and a louver 80 in the image forming apparatus 1 according to the present exemplary embodiment will be described with reference to FIGS. 2 to 6. In the drawings, the front side and the back side of the image forming apparatus 1 are respectively referred to as the front side F and the back side B, a front-back direction is indicated by D1, and a width direction perpendicular to the front-back direction D1 in the horizontal direction is indicated by W.

Figure 2:
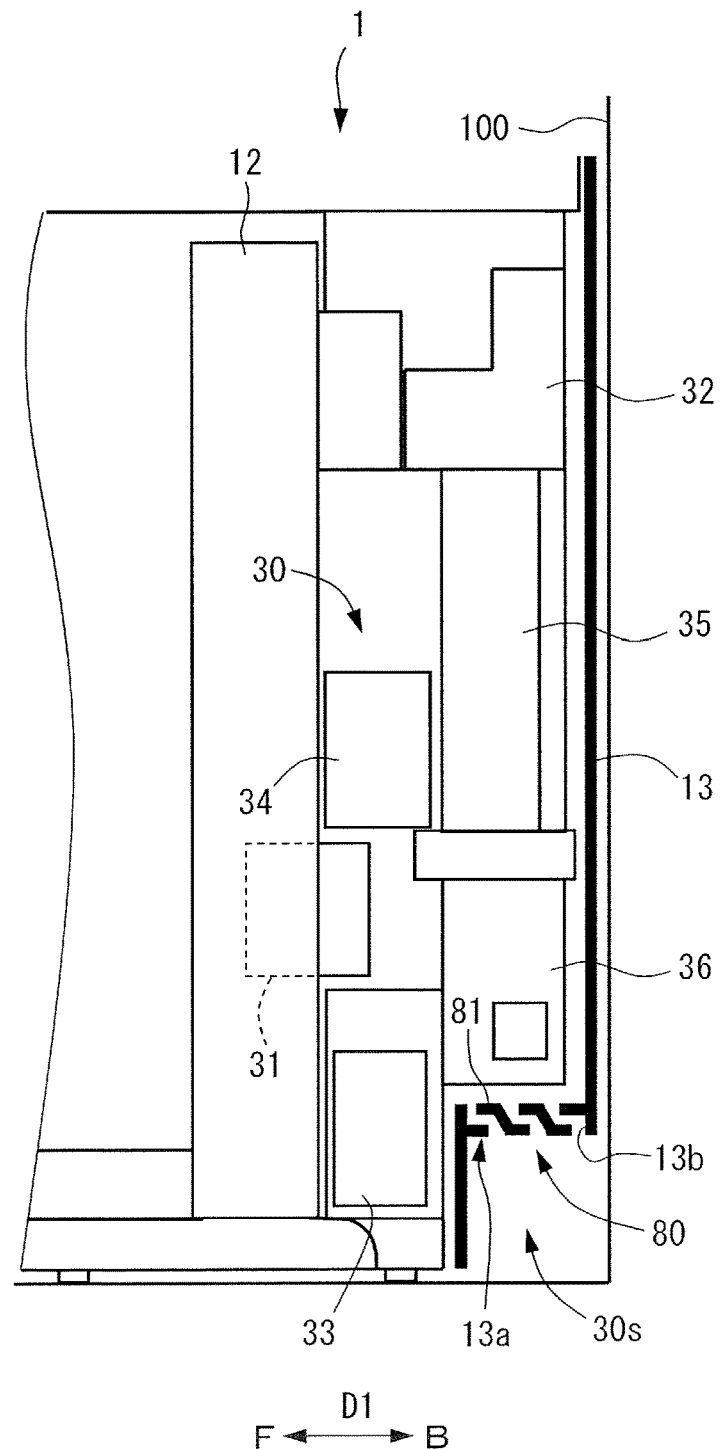
FIG. 2 is a section view of the image forming apparatus according to the exemplary embodiment of the present invention viewed from the side.

As illustrated in FIG. 2, the image forming portion 40, an electrical equipment portion 30, a drive unit 31, a rail component, a toner filling portion, and so forth are attached to a housing 12 of the apparatus body 10. The electrical equipment portion 30 includes, for example, a circuit board and an electric board box. The drive unit 31 drives a movable portion such as the image forming portion 40. The rail component is used for attaching and detaching a process cartridge. The toner filling portion supplies toner. In the present exemplary embodiment, the electrical equipment portion 30 is configured as a board for outputting a control signal of an image signal for image formation and an image forming high voltage.

Generally, in consideration of operability, a process cartridge or the like that can be replaced by a user is disposed on the front side F in the apparatus body 10 of the image forming apparatus 1. The image forming portion 40 is disposed in a center portion in the apparatus body 10. The sheet conveyance portion 50 that conveys the sheet S fed by the sheet feed portion 20 and discharges the sheet S to be supported on the discharge tray 62 provided on an upper portion of the apparatus body 10 after image formation is disposed on the right side in the apparatus body 10. Other components such as the electrical equipment portion 30 and the drive unit 31 are not disposed on the left side but on the back side B in the apparatus body 10 in order to suppress dimensional increase in size of the image forming apparatus 1 in the width direction W.

In the present exemplary embodiment, the drive unit 31 is attached to the housing 12 of the apparatus body 10. The drive unit 31 is provided for driving a process cartridge, and is disposed at a position in the vicinity of the process cartridge such that a drive shaft thereof is not inclined with respect to a drive portion of the process cartridge. The electrical equipment portion 30 and an air exhausting fan 32 are disposed in this order further on the back side B than the drive unit 31. The electrical equipment portion 30 includes a high-voltage board box 33, a power source board large box 34, a control power source board box 35, and a power source board small box 36, and these boxes are disposed in this order further on the back side B than the housing 12. The power source board small box 36 accommodates a circuit board 37 illustrated in FIG. 6. The circuit board 37 accommodated in the power source board small box 36 is disposed further on the back side B of the image forming apparatus 1 than the image forming portion 40, and circuit components for driving the image forming portion 40 are implemented on the circuit board 37.

The electrical equipment portion 30 is provided so as to project in the horizontal direction with respect to the housing 12 and such that a space 30s is provided under the electrical equipment portion 30. The cover 13 that covers the electrical equipment portion 30 is attached to the housing 12. Alternatively, the cover 13 may be attached to the electrical equipment portion 30 or another attachment instead of being attached to the housing 12. The cover 13 is formed so as to follow the outer shape of the electrical equipment portion 30 projecting with respect to the housing 12 when the image forming apparatus 1 is viewed from the side. Therefore, the cover 13 includes a horizontal lower surface 13a between the power source board small box 36 projecting in the horizontal direction and the space 30s provided under the power source board small box 36.

Plural attachments attached on the back side B of the image forming apparatus 1 are arranged in the front-back direction D1 so as to overlap with one another. Therefore, it is required to arrange the attachments in deep consideration of air flowability in the apparatus body 10 because, in image formation, plural devices implemented on the boards of the electrical equipment portion 30 generate heat and thus the temperature of the electrical equipment portion 30 rises. The boards that generate heat are preferably disposed further on the outside in the apparatus body 10 so as to be closer to a normal-temperature environment such that the heat does not stagnate in the apparatus body 10. This helps dissipation of the heat generated by the boards.

Since the cover 13 shields the electrical equipment portion 30 and the space 30s from each other in the image forming apparatus 1, a through hole 13b for ventilation is defined in the lower surface 13a in order to suppress the rise of temperature in the apparatus body 10 resulting from the shielding. The louver 80 for ventilation is attached to the through hole 13b. That is, the louver 80 is provided in the through hole 13b in the lower surface 13a of the cover 13 and includes plural slats 81 arranged with intervals therebetween, and the inside of the cover 13 communicates with the space 30s through the louver 80. The inside of the cover 13 communicates with the outside of the cover 13 through the louver 80. Airflow can flow through the intervals between the slats 81 as indicated by broken arrows in FIG. 6. In the present exemplary embodiment, an airflow from the outside of the cover 13 to the inside of the cover 13 through the louver 80 is generated as a result of the air exhausting fan 32 operating.

In the case where a louver is provided in a side surface of the cover 13, a space has to be provided between the cover 13 and a wall surface 100 due to the placement of the louver, and this increases the area required for installation of the image forming apparatus 1. In addition, the inside of the cover 13 may be seen through the louver, which is not pleasant in terms of outer appearance. In contrast, since the louver 80 according to the present exemplary embodiment is provided under the power source board small box 36 so as to face the space 30s, the image forming apparatus 1 can be installed so as to be in contact with the wall surface 100, and it becomes difficult to see the inside of the cover 13 from the outside. Thus, the area for installation of the apparatus body 10 can be reduced and the outer appearance of the apparatus body 10 can be improved.

Figure 3:
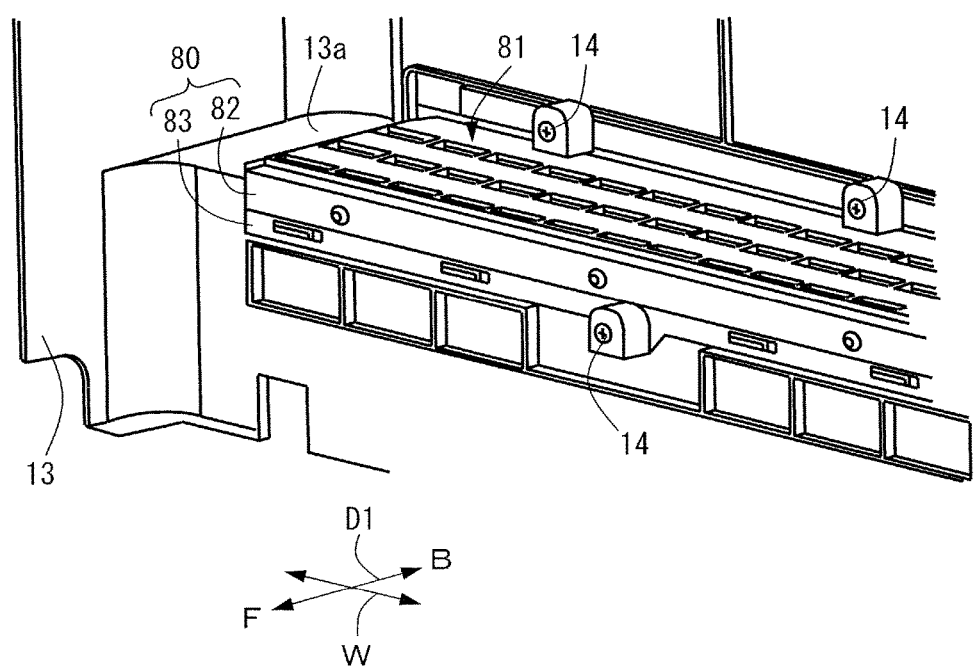
FIG. 3 is a perspective view of a louver according to the exemplary embodiment of the present invention attached to a cover.

As illustrated in FIG. 3, the louver 80 serving as a louver unit has a substantially flat plate shape, is attached to the lower surface 13a of the cover 13, and is fastened by being screwed via bolts 14. The louver 80 includes a first louver member 82 serving as a first louver portion and a second louver member 83 serving as a second louver portion. The first louver member 82 and the second louver member 83 are each formed of synthetic resin and formed by, for example, injection molding. The louver 80 includes the plural slats 81, and the slats 81 are arranged in an array including, for example, two rows in the front-back direction D1 and multiple rows in the width direction W. That is, the louver 80 is attached to the cover 13 of the housing 12 at a position under the power source board small box 36 with a space of a certain size provided between the louver 80 and the power source board small box 36, and the inside and outside of the cover 13 of the housing 12 communicates with each other through the louver 80. In addition, the cover 13 of the housing 12 has such a shape that the louver 80 and a surface on which the image forming apparatus 1 is installed oppose each other with the space 30s therebetween.

Figure 4:
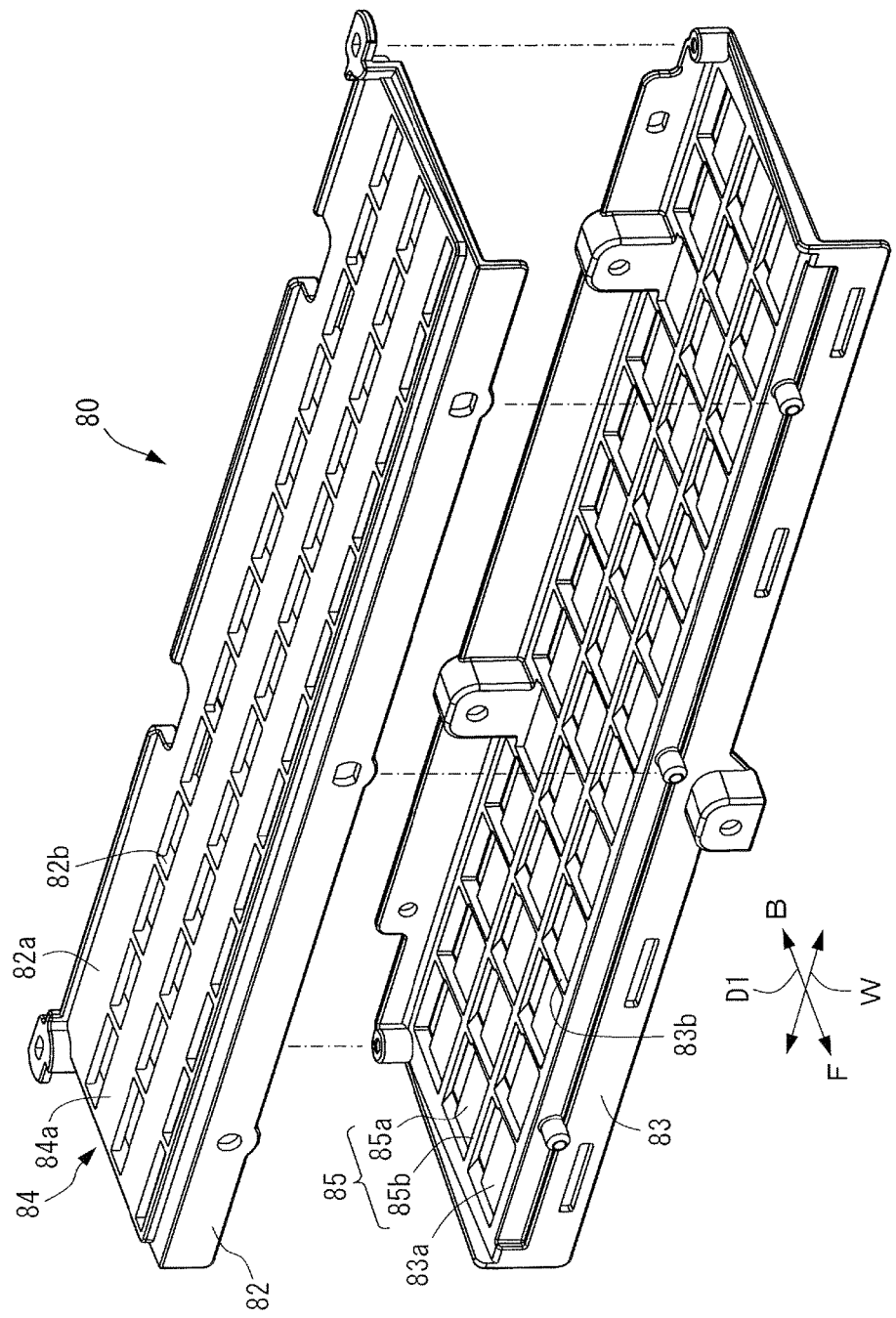
FIG. 4 is an exploded perspective view of the louver according to the exemplary embodiment of the present invention illustrating an overall configuration thereof.

As illustrated in FIG. 4, the louver 80 is assembled from the first louver member 82 and the second louver member 83 mounted on the first louver member 82. That is, the louver 80 is formed as an integrated member by assembling the first louver member 82 and the second louver member 83, which are separate members. To be noted, the first louver member 82 and the second louver member 83 may be integrated into a single member after formation of the louver 80 as long as these members are separate members before formation of the louver 80.

Figure 5A:
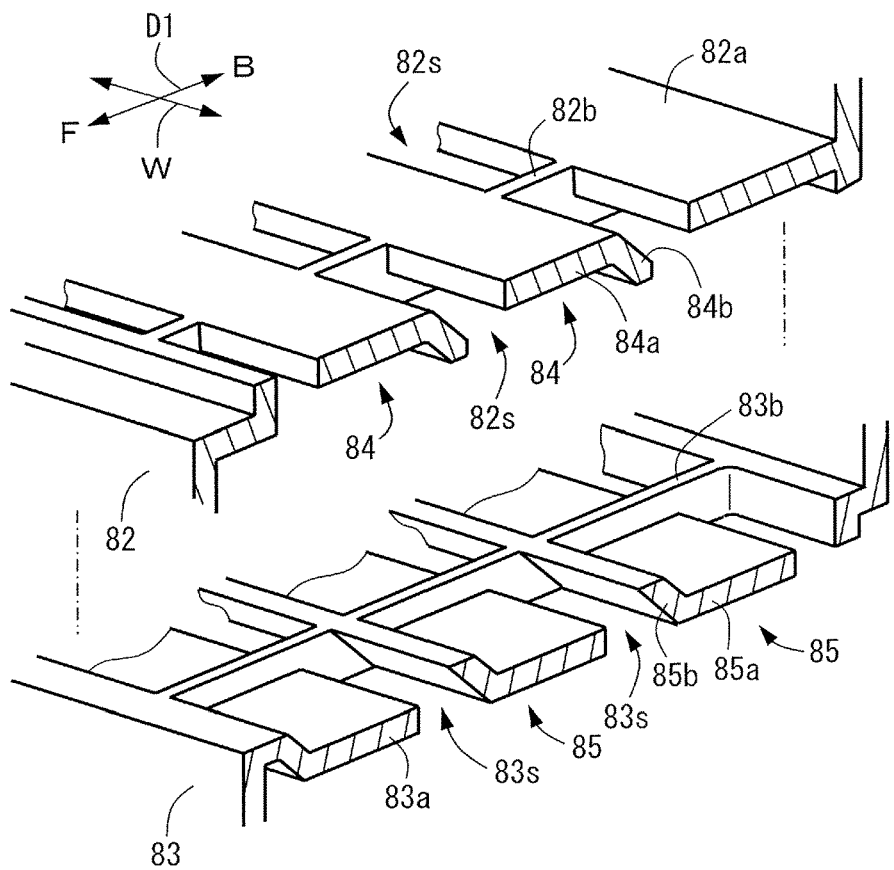
FIG. 5A is an enlarged perspective view of a part of a louver cut off from the louver according to the exemplary embodiment of the present invention before being assembled.
Figure 5B:
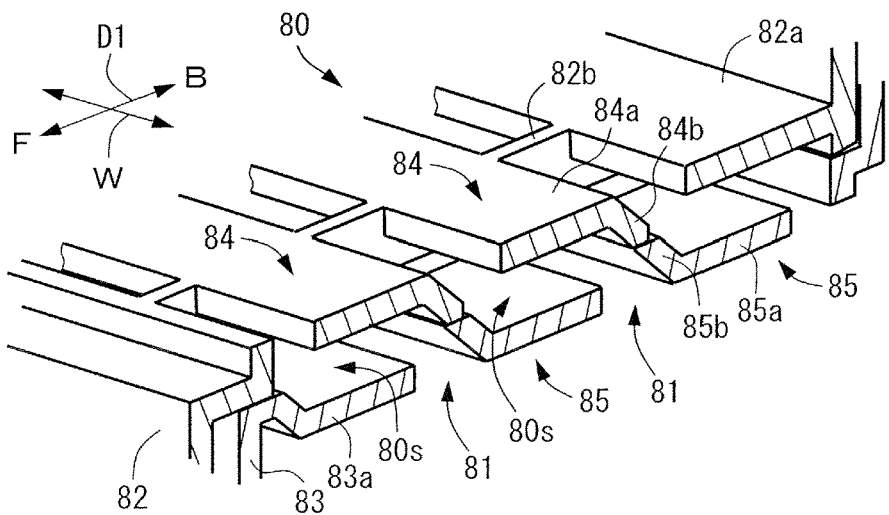
FIG. 5B is an enlarged perspective view of a part of a louver cut off from the louver according to the exemplary embodiment of the present invention after being assembled.
Figure 6:
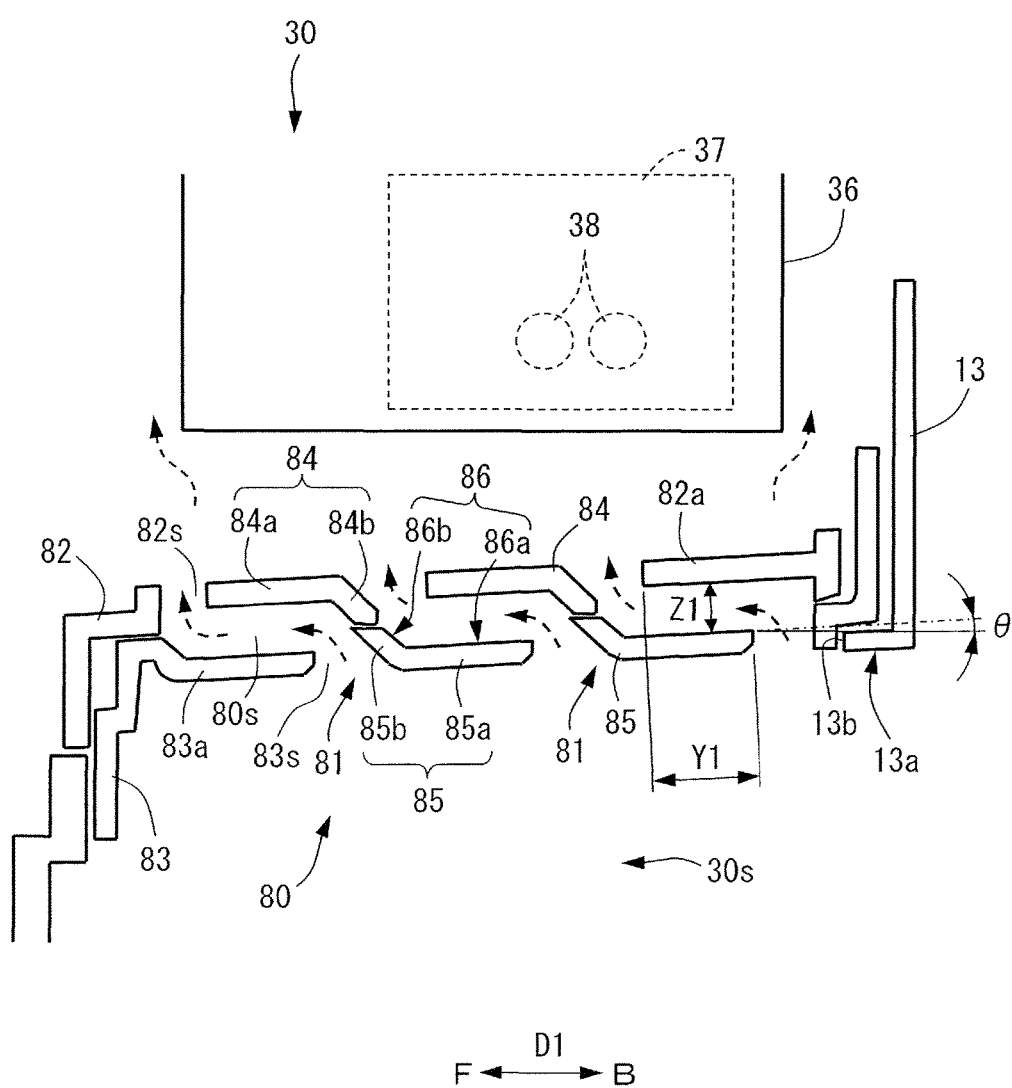
FIG. 6 is a section view of the louver according to the exemplary embodiment of the present invention.

As illustrated in FIGS. 5A to 6, the first louver member 82 includes first slat portions 84 serving as slat portions that constitute a part of the slats 81. In the front-back direction D1, the first louver member 82 includes two first slat portions 84 disposed on the front side F and an auxiliary slat portion 82a disposed on the back side B. The first slat portions 84 are arranged in an array including two rows in the front-back direction D1 and multiple rows in the width direction W as illustrated in FIG. 4. In addition, in the first louver member 82, partition walls 82b are provided between first slat portions 84 adjacent to each other in the width direction W and between auxiliary slat portions 82a adjacent to each other in the width direction W so as to partition the adjacent first slat portions 84 and the adjacent auxiliary slat portions 82a. That is, the first louver member 82 includes plural first slat portions 84 arranged with intervals therebetween. In addition, openings between adjacent first slat portions 84 are regarded as openings 82s of the first louver member 82.

The second louver member 83 includes second slat portions 85 serving as slat portions constituting another part of the slats 81. In the front-back direction D1, the second louver member 83 includes two second slat portions 85 disposed on the back side B and an auxiliary slat portion 83a disposed on the front side F. The second slat portions 85 are arranged in an array including two rows in the front-back direction D1 and multiple rows in the width direction W as illustrated in FIG. 4, and one slat 81 is constituted by one second slat portion 85 and one first slat portion 84 opposing the one second slat portion 85. In addition, in the second louver member 83, partition walls 83b are provided between second slat portions 85 adjacent to each other in the width direction W and between auxiliary slat portions 83a adjacent to each other in the width direction W so as to partition the adjacent second slat portions 85 and the adjacent auxiliary slat portions 83a. That is, the second louver member 83 includes plural second slat portions 85 arranged with intervals therebetween. In addition, openings between adjacent second slat portions 85 are regarded as openings 83s of the second louver member 83.

The second slat portions 85 are disposed below the first slat portions 84 so as to overlap with the first slat portions 84 at least partially in the front view of the louver 80. The amount of overlap Y1 between the first slat portions 84 and the second slat portions 85 is set to be, for example, 8 mm or larger. According to this, a foreign matter such as a hand or a finger can be prevented from getting inside the cover 13 from the outside, and the inside of the cover 13 can be prevented from being seen from below.

Here, in the specification of the present application, the front view of the louver 80 corresponds to a state in which, for example, the louver 80 is viewed from a direction perpendicular to a direction of alignment of the slats 81, that is, the front-back direction D1, and to the width direction W of the slats 81 perpendicular to the front-back direction D1. In addition, the front view of the louver 80 corresponds to a state in which, for example, the louver 80 is viewed from a normal direction of a side surface thereof in the case where the louver 80 is configured to have a substantially flat plate shape overall. Alternatively, the front view of the louver 80 corresponds to a state in which, for example, the louver 80 installed in the image forming apparatus 1 is viewed from the vertical direction. In either case, if the other side of the louver 80 installed in the image forming apparatus 1 can be seen through the louver 80 in the front view thereof, a fluid dropping inside the cover 13 may directly drop to the outside without being blocked by the louver 80. To address this, in the present exemplary embodiment, the first slat portions 84 and the second slat portions 85 overlap at least partially in the front view of the louver 80. According to this, the fluid dropping inside the cover 13 is blocked by at least one of the first slat portions 84 and the second slat portions 85, and is thus prevented from directly dropping to the outside.

In the present exemplary embodiment, the second louver member 83 is disposed right under the first louver member 82 such that the second slat portions 85 of the second louver member 83 cover the openings 82s of the first louver member 82 when the louver 80 is seen from below in the vertical direction and such that the openings 82s of the first louver member 82, a gap 80s between the first louver member 82 and the second louver member 83, and the openings 83s of the second louver member 83 communicate with one another between the inside and the outside of the housing 12.

As illustrated in FIG. 6, the louver 80 is provided in the cover 13 such that the front side F of the slats 81 is lower than the back side B thereof in the front-back direction D1, that is, first side of the slats 81 is lower than second side of the slats 81 in the direction of alignment thereof. Specifically, the louver 80 is provided so as to be inclined in the front-back direction D1 with respect to the horizontal direction by a predetermined inclination angle θ such that the back side B is higher than the front side F. The inclination angle θ is, for example, about 5°. Although the inclination angle θ is set to be about 5° in the present exemplary embodiment, the inclination angle θ is not limited to this value. For example, the inclination angle θ is preferably larger than 0° and equal to or smaller than 5°. In addition, the inclination is not limited to the inclination in which the back side B is higher than the front side F, and the front side F may be higher than the back side B. Here, the inclination angle θ corresponds to, for example, an inclination angle between the horizontal plane and the direction of alignment of the slats 81 of the louver 80. The direction of alignment is, for example, the front-back direction D1. Alternatively, the inclination angle θ corresponds to, for example, an inclination angle between the horizontal plane and a side surface of the louver 80 having a substantially flat plate shape.

The first slat portions 84 each include a first overlapping portion 84a and a first connecting portion 84b. The first overlapping portion 84a has a shape following the front-back direction D1, and the first connecting portion 84b has such a shape as to project diagonally downward and toward the back side B from a back end portion of the first overlapping portion 84a. The second slat portions 85 each include a second overlapping portion 85a and a second connecting portion 85b. The second overlapping portion 85a has a shape following the front-back direction D1, and the second connecting portion 85b has such a shape as to project diagonally upward and toward the front side F from a front end portion of the second overlapping portion 85a.

The distal ends of the first and second connecting portions 84b and 85b are disposed at such positions as to oppose each other in an up-down direction and be in contact with or very close to each other. That is, a distal end portion of the first connecting portion 84b and a distal end portion of the second connecting portion 85b oppose each other in the up-down direction, and the second connecting portion 85b is disposed such that an upper surface of the distal end portion of the second connecting portion 85b is placed right under a lower surface of the distal end portion of the first connecting portion 84b. In addition, a first overlapping portion 84a on the front side F of the first louver member 82 overlaps with an auxiliary slat portion 83a of the second louver member 83 in the up-down direction. A first overlapping portion 84a on the back side B of the first louver member 82 overlaps with a second overlapping portion 85a on the front side F of the second louver member 83 in the up-down direction. An auxiliary slat portion 82a of the first louver member 82 overlaps with a second overlapping portion 85a on the back side B of the second louver member 83 in the up-down direction. As a result of these configurations, there is no straight through hole in the up-down direction. Thus, the fluid dropping inside the cover 13 is blocked by at least one of the first slat portions 84 and the second slat portions 85, and is prevented from directly dropping to the outside.

In recent years, image forming apparatuses have come to be sold and used also in developing countries. In some of such developing countries, electrical power supply may be unstable. In the case where the image forming apparatus 1 is used in such an environment, there is a possibility that, for example, a voltage higher than an expected voltage is applied to the image forming apparatus 1, and thus capacitors implemented on a board are overcharged and liquid leakage occurs. In this case, leakage of electrolyte in the capacitors to the outside needs to be prevented such that the electrolyte does not scatter to the outside of the image forming apparatus 1. For example, in the case where liquid leaks from capacitors 38 implemented on the circuit board 37 mounted in the power source board small box 36 disposed above the louver 80 in FIG. 6, the leaked liquid drops toward the louver 80.

Accordingly, in the image forming apparatus 1 according to the present exemplary embodiment, the slats 81 of the louver 80 each include an accumulation portion 86 on the upper surface side thereof as illustrated in FIG. 6. The accumulation portion 86 is capable of accumulating leaked liquid, which is fluid, dropping inside the cover 13. In the present exemplary embodiment, electrolyte of a capacitor is described as an example of a fluid dropping inside the cover 13. However, the fluid is not limited to this, and may be, for example, powder such as developer.

The accumulation portion 86 includes a first inclined surface 86a and a second inclined surface 86b on the second slat portion 85. The first inclined surface 86a is formed on an upper surface of the second overlapping portion 85a and is inclined in the front-back direction D1 of the slats 81 with respect to the horizontal plane such that a back-end portion thereof is higher than a front end portion thereof. The second inclined surface 86b is formed on an upper surface of the second connecting portion 85b, and is inclined in the front-back direction D1 of the slats 81 with respect to the horizontal plane such that a front end portion thereof is higher than a back-end portion thereof. The first inclined surface 86a and the second inclined surface 86b are provided such that a lower end portion of the first inclined surface 86a and a lower end portion of the second inclined surface 86b are continuous. In the louver 80 according to the present exemplary embodiment, each first overlapping portion 84a is provided in a straight line shape, and each second overlapping portion 85a is provided in a straight line shape parallel to the first overlapping portion 84a. The upper surface of each overlapping portion 84a or 85a is inclined by attaching the louver 80 having such a configuration to the cover 13 in such a manner that the front side F thereof is lower than the back side B thereof in the front-back direction D1 of the slats 81. That is, although the louver 80 may be disposed horizontally, the louver 80 is provided with the inclination angle θ such that the leaked liquid flows only in a certain direction.

The effect of the louver 80 in the case where liquid leakage from the power source board small box 36 occurs in the image forming apparatus 1 according to the present exemplary embodiment described above will be described. In this case, the leaked liquid drops the upper surface of a first overlapping portion 84a, or passes a gap between adjacent first overlapping portions 84a and drops onto the upper surface of a first connecting portion 84b or a second connecting portion 85b. The leaked liquid having dropped onto the upper surface of the first overlapping portion 84a flows down toward the front side F due to the inclination of the upper surface, and drops onto the upper surface of a second overlapping portion 85a from an end portion of the first overlapping portion 84a. The leaked liquid having dropped onto the upper surface of the first connecting portion 84b or the second connecting portion 85b flows down onto the upper surface of the second overlapping portion 85a due to the inclination of the connecting portions 84b and 85b. The leaked liquid having reached the upper surface of the second overlapping portion 85a, that is, the first inclined surface 86a, is accumulated on the second inclined surface 86b side, which is the lower side, of the first inclined surface 86a. According to this, the leaked liquid flowing over the first inclined surface 86a and through a gap between adjacent second overlapping portions 85a and dropping to the outside of the cover 13 can be suppressed.

As described above, in the present exemplary embodiment, the louver 80 through which the inside of the cover 13 communicates with the space 30s under the electrical equipment portion 30 is provided in the lower surface 13a of the cover 13 covering the electrical equipment portion 30 provided with the space 30s thereunder. According to this, the louver 80 is not obstructed even in the case where the image forming apparatus 1 is installed such that a side surface of the apparatus body 10 is in contact with the wall surface 100, and thus the image forming apparatus can be installed so as to be in contact with the wall surface 100. This reduces the area required for installation of the image forming apparatus 1. In addition, since the louver 80 is disposed in the lower surface 13a of the cover 13, the inside of the cover 13 is not seen through the louver 80 from above or from the side with respect to the apparatus body 10. Therefore, the area for installation of the apparatus body 10 can be reduced and the outer appearance of the apparatus body 10 can be improved while providing the louver 80 to the apparatus body 10.

Here, the amount of overlap Y1 of the slats 81 is standardized, for example, in the Underwriters Laboratories standards: UL standards, such that the amount of overlap Y1 of the slats 81 is twice or more times as large as gaps Z1 between the slats 81 in the case of providing a slit, or, a hole, in a lower surface of the cover 13 serving as an enclosure. That is, the amount of overlap Y1 is large with respect to the gaps Z1 of the 81. Thus, it is difficult to form the louver 80 as a single member by injection molding. In contrast, according to the present exemplary embodiment, the louver 80 having a large amount of overlap Y1 that satisfies the UL standards can be easily formed also by injection molding because the louver 80 is assembled from two members of the first louver member 82 and the second louver member 83. Therefore, the louver 80 that is low-cost and suitable for mass production can be realized.

In addition, in the present exemplary embodiment, the slats 81 each include, on the upper surface side thereof, the accumulation portion 86 capable of accumulating leaked liquid dropping inside side the cover 13. Therefore, the leaked liquid can be accumulated on the accumulation portion 86 even in the case where, for example, liquid leakage from a capacitor in the electrical equipment portion 30 occurs. Thus, liquid leakage to the outside of the image forming apparatus 1 can be suppressed.

In the present exemplary embodiment described above, a case where the louver 80 is attached to the lower surface 13a of the cover 13 attached on the back side B of the apparatus body 10 has been described. However, the position of the louver 80 is not limited to this. For example, the louver 80 may be attached to a lower surface of a cover attached to a side surface of the apparatus body 10.

In addition, in the present exemplary embodiment described above, a case where the slats 81 each include the accumulation portion 86 on the upper surface side thereof has been described. However, the configuration is not limited to this, and a configuration that does not include the accumulation portion 86 may be employed.

In an image forming apparatus according to an aspect of the present invention, a louver through which the inside of a cover communicates with a space under an electrical equipment portion is provided in a lower surface of the cover. The electrical equipment portion is provided such that the space thereunder is provided, and the cover covers the electrical equipment portion. According to this, the louver is not obstructed even in the case where the image forming apparatus is installed such that a side surface of an apparatus body is in contact with a wall surface, and thus the image forming apparatus can be installed so as to be in contact with the wall surface. In addition, since the louver is provided in the lower surface of the cover, the inside of the cover is not seen through the louver when the apparatus body is viewed from above or from the side. Accordingly, the area required for installation of the apparatus body can be reduced and the outer appearance of the apparatus body can be improved while providing the louver in the apparatus body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-102258, filed May 23, 2016, which is hereby incorporated by reference herein in its entirety.

What is claimed is:

1. An image forming apparatus comprising:
an image forming portion configured to form an image;
a circuit board provided further on a back side of the image forming apparatus than the image forming portion and on which a circuit component configured to drive the image forming portion is implemented;
an apparatus body configured to accommodate the image forming portion and the circuit board; and
a louver unit through which an inside of the apparatus body communicates with an outside of the apparatus body and which is disposed under the circuit board such that at least a part of the louver unit overlaps with the circuit board when the louver unit is viewed in a vertical direction from underneath, the louver unit comprising a first louver portion and a second louver portion, the first louver portion comprising a plurality of first slat portions arranged with first openings therebetween, the second louver portion comprising a plurality of second slat portions arranged with second openings therebetween,
wherein the apparatus body comprises such a shape that the louver unit and a surface on which the image forming apparatus is installed oppose each other with a space therebetween,
wherein the plurality of second slat portions are disposed under the plurality of first slat portions such that, in a case where the louver unit is viewed in the vertical direction from underneath, the plurality of second slat portions respectively overlap the first openings, and
wherein the first openings and the second openings communicate the inside with the outside of the apparatus body.

2. The image forming apparatus according to claim 1, wherein the second louver portion comprises an accumulation portion configured to accumulate a fluid dropping from the circuit board.

3. The image forming apparatus according to claim 2, wherein each of the plurality of second slat portions comprises a first inclined surface and a second inclined surface, the first inclined surface being inclined in a direction of alignment of the plurality of second slat portions with respect to a horizontal plane, the second inclined surface being inclined in the direction of alignment of the plurality of second slat portions with respect to the horizontal plane and being provided such that a lower end portion of the first inclined surface is continuous with a lower end portion of the second inclined surface, and
wherein the accumulation portion is constituted by the first inclined surface and the second inclined surface.

4. The image forming apparatus according to claim 2, further comprising a capacitor containing electrolyte and implemented on the circuit board.

5. The image forming apparatus according to claim 3, wherein each of the plurality of first slat portions comprises a first overlapping portion and a first connecting portion, the first overlapping portion being disposed to overlap a corresponding second opening in a case where the louver unit is viewed from underneath in the vertical direction, the first connecting portion being configured to project diagonally downward from an end portion of the first overlapping portion in the vertical direction,
wherein each of the plurality of second slat portions comprises a second overlapping portion including the first inclined surface and a second connecting portion including the second inclined surface, the second overlapping portion being configured to extend in the direction of alignment of the plurality of second slat portions, the second connecting portion being configured to project diagonally upward from an end portion of the second overlapping portion in the vertical direction,
wherein an end of the first connecting portion is disposed to face to an end of the second connecting portion in the vertical direction.

6. The image forming apparatus according to claim 5, further comprising a cover configured to form a part of an outer shape of the apparatus body,
wherein the louver unit is provided in the cover such that the direction of alignment of the plurality of second slat portions is inclined with respect to a horizontal plane by an inclination angle $\theta$ satisfying $0°<\theta\leq 5°$.

7. The image forming apparatus according to claim 1, wherein an amount of overlap between the plurality of first slat portions and the plurality of second slat portions in a front view of the louver unit is twice or more times as large as a gap between the plurality of first slat portions and the plurality of second slat portions.

8. An image forming apparatus comprising:
an image forming portion configured to form an image;
a housing accommodating the image forming portion;
an electrical equipment portion provided in the housing and comprising a circuit board on which a circuit component is implemented, the electrical equipment portion being provided such that a back face of the electrical equipment portion projects in a back direction of the image forming apparatus further than a back face of the housing and such that a space is provided under the electrical equipment portion between the electrical equipment portion and a surface on which the image forming apparatus is installed in a vertical direction;

a cover provided on the back face of the housing and covering the electrical equipment portion; and a louver unit configured to communicate an inside of the cover with an outside of the cover, and provided in the cover under the electrical equipment portion such that a space is provided between the louver unit and the surface on which the image forming apparatus is installed in the vertical direction;

wherein the louver unit comprises a first louver portion and a second louver portion; the first louver portion comprising a plurality of slat portions provided with openings therebetween; the second louver portion disposed under the first louver portion in the vertical direction and comprising a plurality of slat portions provided with openings therebetween;

wherein the plurality of slat portions of the second louver portion respectively overlap the openings of the first louver portion when viewed in the vertical direction from underneath, and wherein the opening of the first louver portion and the opening of the second louver portion communicate the inside with the outside of the cover.

9. The image forming apparatus according to claim 8, wherein the second louver portion comprises an accumulation portion configured to accumulate a fluid dropping from the circuit board.

10. The image forming apparatus according to claim 9,
wherein each of the plurality of slat portions of the second louver portion comprises a first inclined surface and a second inclined surface, the first inclined surface being inclined in a direction of alignment of the plurality of slat portions of the second louver portion with respect to a horizontal plane, the second inclined surface being inclined in the direction of alignment of the plurality of slat portions of the second louver portion with respect to the horizontal plane and being provided such that a lower end portion of the first inclined surface is continuous with a lower end portion of the second inclined surface, and wherein the accumulation portion is constituted by the first inclined surface and the second inclined surface.

11. The image forming apparatus according to claim 9, further comprising a capacitor containing electrolyte and implemented on the circuit board.

12. The image forming apparatus according to claim 10,
wherein each of the plurality of slat portions of the first louver portion comprises a first overlapping portion and a first connecting portion, the first overlapping portion being disposed to overlap a corresponding opening of the second louver portion when viewed from underneath in the vertical direction, the first connecting portion being configured to project diagonally downward from an end portion of the first overlapping portion in the vertical direction, wherein each of the plurality of slat portions of the second louver portion comprises a second overlapping portion including the first inclined surface and a second connecting portion including the second inclined surface, the second overlapping portion being configured to extend in the direction of alignment of the plurality of slat portions of the second louver portion, the second connecting portion being configured to project diagonally upward from an end portion of the second overlapping portion in the vertical direction, wherein an end of the first connecting portion is disposed to face to an end of the second connecting portion in the vertical direction.

13. The image forming apparatus according to claim 12, wherein the louver unit is provided in the cover such that the direction of alignment of the plurality of slat portions of the second louver portion is inclined with respect to a horizontal plane by an inclination angle $\theta$ satisfying $0°<\theta\leq5°$.

14. The image forming apparatus according to claim 8, wherein an amount of overlap between the plurality of slat portions of the first louver portion and the plurality of slat portions of the second louver portion in a front view of the louver unit is twice or more times as large as a gap between the plurality of slat portions of the first louver portion and the plurality of slat portions of the second louver portion.

15. An image forming apparatus comprising:
an image forming portion configured to form an image;
a housing accommodating the image forming portion;
an electrical equipment portion provided in the housing and comprising a circuit board on which a circuit component is implemented, the electrical equipment portion being provided such that a back face of the electrical equipment portion projects in a back direction of the image forming apparatus further than a back face of the housing and such that a space is provided under the electrical equipment portion between the electrical equipment portion and a surface on which the image forming apparatus is installed in a vertical direction;

a cover provided on the back face of the housing and covering the electrical equipment portion; and a louver unit configured to communicate an inside of the cover with an outside of the cover, and provided in the cover under the electrical equipment portion such that a space is provided between the louver unit and the surface on which the image forming apparatus is installed in the vertical direction, wherein the louver unit comprises a louver portion and an accumulation portion, the louver portion comprising a plurality of slat portions provided with openings therebetween, the accumulation portion configured to accumulate a falling object falling in the cover.

16. The image forming apparatus according to claim 15, wherein the accumulation portion is configured to accumulate the falling object from the electrical equipment portion.

17. The image forming apparatus according to claim 15, wherein the accumulation portion is configured to accumulate a fluid as the falling object.

18. The image forming apparatus according to claim 15,
wherein the accumulation portion comprises a first inclined surface and a second inclined surface,
wherein the first inclined surface is provided under a first slat among the plurality of slat portions in the vertical direction and is inclined with respect to a horizontal direction,
wherein the second inclined surface is provided under an opening formed between the first slat and a second slat adjacent to the first slat, is inclined with respect to the first inclined surface, and is provided such that a lower end portion of the first inclined surface is continuous with a lower end portion of the second inclined surface.

19. The image forming apparatus according to claim 15, wherein the louver unit is provided in the cover such that a direction of alignment is inclined with respect to a horizontal plane by an inclination angle $\theta$ satisfying $0°<\theta\leq5°$.

* * * * *